(12) United States Patent
Shimo et al.

(10) Patent No.: US 6,447,858 B1
(45) Date of Patent: Sep. 10, 2002

(54) PIPE FOR HOT-WATER CIRCULATION

(75) Inventors: Hiroyuki Shimo, Kurashiki; Takashi Yamashita, Tsukuba, both of (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/856,478

(22) PCT Filed: Oct. 5, 2000

(86) PCT No.: PCT/JP00/06968

§ 371 (c)(1),
(2), (4) Date: Jun. 8, 2001

(87) PCT Pub. No.: WO01/27515

PCT Pub. Date: Apr. 19, 2001

(30) Foreign Application Priority Data

Oct. 18, 1999 (JP) ............................................. 11-288782

(51) Int. Cl.[7] ................................................ C09K 5/00
(52) U.S. Cl. ......................... 428/35.7; 525/95; 428/35.7
(58) Field of Search ............................ 428/35.7; 525/95

(56) References Cited

U.S. PATENT DOCUMENTS 5,034,253 A * 7/1991 Miyake et al. ............. 428/36.3
5,895,797 A * 4/1999 Hayashihara et al. ....... 524/503
5,972,447 A  10/1999 Hata et al. .................. 428/35.7

FOREIGN PATENT DOCUMENTS

| JP | 61-140691 | * | 6/1986 |
| JP | 2-74341 | * | 3/1990 |
| JP | 7-331020 | * | 12/1995 |
| JP | 10-24505 | * | 1/1998 |
| JP | 10-230555 | * | 9/1998 |

* cited by examiner

Primary Examiner—C. Melissa Koslow
Assistant Examiner—Shalie Manlove
(74) Attorney, Agent, or Firm—Oblon, Spivak, McClelland, Maier & Neustadt, P.C.

(57) ABSTRACT

The present invention provides a multilayered pipe for hot water circulation having excellent oxygen barrier properties and anti-crack properties, in particular, excellent anti-crack properties at low temperatures by using a thermoplastic resin composition comprising 50 to 99% by weight of an ethylene-vinyl alcohol copolymer (A) and 1 to 50% by weight of multilayered polymer particles (B).

5 Claims, No Drawings

PIPE FOR HOT-WATER CIRCULATION

TECHNICAL FIELD

The present invention relates to multilayered pipes, in particular, multilayered pipes for hot water circulation used for central heating or central floor heating facilities using hot water circulation, the multilayered pipes for hot water circulation having a thermoplastic resin composition (C) layer containing 50 to 99% by weight of ethylene-vinyl alcohol copolymer (A) and 1 to 50% by weight of multilayered polymer particles (B).

BACKGROUND ART

Conventionally, for floor heating by hot water circulation, pipes for hot water circulation made of metal have been commonly used. In many cases, pipes for hot water circulation are buried in concrete at the time of construction and installed under the floor, and therefore once the pipe is installed, subsequent repair work is very difficult, and usually a durability of about 50 years is required. Under such severe conditions, it is preferable to use plastic pipes, which are inexpensive compared with metal pipes and whose material is not corroded. Examples of such plastic pipe material include polyethylene, polypropylene, and polybutene.

However, when such plastic pipes are used in a floor heating system that employs a hot water circulation, metal portions of the heat exchanger, pump, or the like are corroded by oxygen. It seemed that this corrosion occurs because oxygen in the air passes through plastic pipe walls, permeates into hot water circulating in the pipe and is dissolved therein. Therefore, multilayered polyethylene pipes having aluminum as an intermediate layer were developed. However, the aluminum layer may crack, which seems to be caused by temperature changes, so that the corrosion due to oxygen is not prevented.

As a countermeasure for that, various multilayered pipes formed of a plastic resin having excellent oxygen gas barrier properties and polyethylene have been studied. Among them, it has been confirmed that multilayered pipes employing ethylene-vinyl alcohol copolymer (hereinafter, referred to as EVOH) have the best oxygen barrier properties and mechanical strength, and nowadays EVOH based multilayered plastic pipes are widely used as pipes for hot water circulation. For example, Japanese Laid-Open Patent Publication No. 61-140691 describes pipes for hot water circulation including an EVOH layer as an intermediate layer, and Japanese Laid-Open Patent Publication No. 2-74341 describes pipes for hot water circulation having an EVOH layer as the outermost layer. However, for both of them, anti-crack properties are not always sufficient.

It is believed that the insufficient anti-crack properties stem from the rigidity of EVOH. In other words, EVOH has the problem that the EVOH itself is a very rigid resin compared with ordinary plastic resins although EVOH has excellent oxygen barrier properties and mechanical strength (impact resistance) as described above. In order to improve the rigidity of EVOH, various studies have been conducted. For example, Japanese Laid-Open Patent Publication No. 10-24505 describes a multilayered structure that is used for a fuel container, in which the structure comprises a resin composition layer having excellent gas barrier properties and impact resistance and that is formed of an EVOH resin and resin fine particles having a core-shell structure. Furthermore, Japanese Laid-Open Patent Publication No. 7-331020 describes a resin composition having excellent flexibility that comprises EVOH and multilayered polymer particles including a polymer that contains epoxy groups.

However, these studies have been conducted only from the viewpoint of imparting flexibility and impact resistance to a molded product, such as a film and a tank having gas barrier properties, and studies to improve characteristics of EVOH regarding rigidity have not been conducted from the viewpoint of improving the anti-crack properties. The impact resistance shown in such prior art is the ability to withstand stress applied instantly from the outside of a pipe. On the other hand, the anti-crack properties referred to in the present invention are the ability to withstand stress applied not instantly but slowly, in general, from the inside of a pipe, in particular, the ability to withstand tensile stress. Therefore, in order to satisfy the anti-crack properties, the molded product requires a performance that is different from the performance that satisfies the above-mentioned impact resistance.

Furthermore, in the pipes for hot water circulation containing EVOH as that of the present invention, impact from the outside of the pipe such as drop impact or collision generally is not likely to happen, so that the anti-crack properties are evidently more important than the impact resistance. In other words, in general, cracks may occur in an EVOH layer when the pipe for hot water circulation is bent slowly with a special tool, as it is required. Furthermore, when two pipes for hot water circulation are connected with a plastic or a metal connector, it is necessary first to enlarge the diameter of one end of the pipes slowly with a special tool for enlargement in several discrete operations. In this case, a large crack may occur in the EVOH layer. Therefore, the anti-crack properties of pipes for hot water circulation are different properties from impact resistance, and are important properties.

Japanese Laid-Open Patent Publication No. 10-230555 describes that a multilayered pipe comprising a resin composition layer having excellent flexibility is used for a pipe for hot water circulation, in which the resin composition layer comprises an EVOH resin and an ethylene-(meth)acrylic acid resin. In this multilayered pipe, no cracks occur in the EVOH layer when the temperature at which the pipe is deformed is at room temperature level (about 20° C.). However, since pipes for hot water circulation are used generally in cold areas, the anti-crack properties are not necessarily sufficient at work, especially in an environment where the air outside temperature is very low (e.g., −15° C.), as has been made clear by the case described below.

In order to improve the anti-crack properties at low temperatures, it was attempted to improve the EVOH layer by adding a flexible polymer. However, the following was found when a multilayered pipe having a resin composition containing EVOH and flexible polymer as the outermost layer was produced. With certain types of flexible polymer blended, the EVOH resin may be deposited on a lip portion of an extrusion die and the deposit on the lip portion of the die is sometimes attached to the surface of the pipe, which degrades the commercial value of the pipe as a finished product, (which will described in examples and comparative examples later). Therefore, there has been no successful attempt to improve the pipe for hot water circulation from the viewpoint of improving the anti-crack properties, and at present, no pipes for hot water circulation having an EVOH based resin composition layer having excellent anti-crack properties and excellent gas barrier properties are available.

Thus, there is a great demand for development of pipes for hot water circulation comprising an EVOH based resin composition layer having oxygen barrier properties and excellent anti-crack properties, in particular, anti-crack properties at low temperatures.

DISCLOSURE OF INVENTION

It is an object of the present invention to solve the above problem. The present invention provides a multilayered pipe for hot water circulation having excellent oxygen barrier properties and anti-crack properties, in particular, anti-crack properties at low temperatures.

More specifically, the present invention is directed to a multilayered pipe for hot water circulation including a thermoplastic resin composition (C) layer comprising 50 to 99% by weight of an ethylene-vinyl alcohol copolymer (A) and 1 to 50% by weight of multilayered polymer particles (B).

In a preferred embodiment, the multilayered polymer particles (B) have a hard layer as an outermost layer and a rubber layer in an inner portion.

In a preferred embodiment, a polymer constituting the multilayered polymer particles (B) has a reactivity with or an affinity for a hydroxyl group.

In a preferred embodiment, a polymer constituting the hard layer of the multilayered polymer particles (B) has a carboxyl group.

In a preferred embodiment, a polymer constituting the hard layer of the multilayered polymer particles (B) has an epoxy group.

In a preferred embodiment, the thermoplastic resin composition (C) layer is arranged as an outermost layer of the pipe for hot water circulation.

BEST MODE FOR CARRYING OUT THE INVENTION

In the present invention, in order to improve the gas barrier properties and the anti-crack properties of an EVOH resin, especially in order to improve the anti-crack properties at low temperatures, the employment of a thermoplastic resin composition (C) layer, the composition being obtained by blending multilayered polymer particles (B) to an EVOH (A), is the most distinctive feature. It has been found that in the multilayered polymer particles (B), it is preferable that a hard layer is provided as the outermost layer, and a rubber layer is provided in an inner portion. In addition, it has been found that in order to improve further the anti-crack properties of a blend of the EVOH (A) and the multilayered polymer particles (B), it is preferable to use multilayered polymer particles (B) that include a resin layer as their outermost layer, the polymer constituting a functional group having a reactivity with or an affinity for the hydroxyl group of the EVOH (A). Thus, the present invention has been attained.

As the EVOH (A) used in the present invention, copolymers obtained by saponifying ethylene-vinyl ester copolymer are preferable. Above all, it is preferable that the ethylene content of the EVOH (A) is 15 to 70 mol %, more preferably, 20 to 65 mol %, and most preferably 25 to 60 mol %. When the ethylene content is less than 15 mol %, the melt molding properties may be poor, and the water resistance and the hot water resistance may be degraded. On the other hand, when the ethylene content is more than 70 mol %, the gas barrier properties may be insufficient. The degree of saponification of the vinyl ester component is preferably 85% or more, and more preferably 90% or more. When the degree of sapofinication is less than 85%, the gas barrier properties and the heat stability may be poor. Furthermore, when the ethylene content is more than 70% or the degree of saponification is less than 85%, the gas barrier properties may be degraded.

A typical example of the vinyl ester used to produce the EVOH (A) is vinyl acetate, but other vinyl esters such as fatty acid vinyl esters (e.g., vinyl propionate, vinyl pivalate, and the like) can be used, too. The EVOH (A) may contain 0.0002 to 0.2 mol % of a vinyl silane compound as a copolymerized componet. Examples of a vinyl silane compound include vinyl trimethoxy silane, vinyl triethoxy silane, vinyl tri(β-methoxy-ethoxy) silane, and γ-methacryloxypropyl methoxy silane. Among these, vinyl trimethoxy silane and vinyl triethoxy silane are preferable. Furthermore, as long as they do not interfere with the purpose of the present invention, other monomers, for example, propylene, butylene, or unsaturated carboxylic acids and their esters such as (meth)acrylic acid, methyl (meth)acrylate, and ethyl (meth)acrylate, and vinyl pyrrolidones such as N-vinyl pyrrolidone may be copolymerized.

A preferable melt flow rate (MFR) (190° C. under a load of 2160 g) of the EVOH (A) used in the present invention is 0.1 to 50 g/10 min., and most preferably 0.5 to 30 g/10 min. For the EVOH (A), which has a melting point of about 190° C. or higher than 190° C., the MFR is measured under a load of 2160 g at a plurality of temperatures, each of which is equal to or higher than the melting point. Then, in a semi-logarithmic graph, the inverted number of the measured temperature in terms of the absolute temperature scale is plotted on the horizontal axis, and the logarithm of the MFR is plotted on the vertical axis. Thus, the MFR is represented by a value extrapolated to 190° C. The EVOH (A) can be one kind of EVOH or a mixture of two or more EVOHs.

The multilayered polymer particles (B) used in the present invention are particles including at least a hard layer and a rubber layer. Either of these layers can constitute the outermost layer, but it is preferable that the hard layer is the outermost layer and the rubber layer is located inside. Herein, the term "rubber layer" refers to a polymer layer, wherein the polymer has a glass transition temperature (hereinafter, also referred to as Tg) of 25° C. or lower, and the term "hard layer" refers to a polymer layer wherein the polymer has a Tg of more than 25° C. The multilayered polymer particles (B) may be constituted by two layers, three, or four or more layers. In the case of a two layer structure, the structure may be rubber layer (core layer)/hard layer (outermost layer). In the case of a three layer structure, the structure may be hard layer (core layer)/rubber layer (intermediate layer)/hard layer (outermost layer), rubber layer (core layer)/rubber layer (intermediate layer)/hard layer (outermost layer), or rubber layer (core layer)/hard layer (intermediate layer)/hard layer (outermost layer). In the case of a four layer structure, the structure may be, for example, rubber layer (core layer)/hard layer (intermediate layer)/rubber layer (intermediate layer)/hard layer (outermost layer).

There is no particular limitation on the components of the rubber layer of the multilayered polymer particles (B) used in the present invention. Examples of preferable polymer as a component of the layer include conjugated diene polymers such as polybutadiene, polyisoprene, butadiene-isoprene copolymer, polychloroprene, styrene-butadiene copolymer, acrylonitrile-butadiene copolymer, and acrylate-butadiene copolymer; hydrogenated products of the conjugated diene polymers; olefin rubbers such as ethylene-propylene copolymers; acrylic rubbers such as polyacrylates; polyorganosiloxanes; thermoplastic elastomers; and ethylene ionomer copolymers. These can be used alone or in combination of two or more. Among these, acrylic rubbers, conjugated diene polymers and hydrogenated products of the conjugated diene polymers are preferable.

The acrylic rubber can be prepared by polymerizing acrylates. Examples of acrylates include alkyl acrylates such as methyl acrylate, ethyl acrylate, propyl acrylate, butyl acrylate, 2-ethylhexyl acrylate, and octyl acrylate. Among these, butyl acrylate and ethyl acrylate are preferable.

The acrylic rubber and the conjugated diene polymers are produced by polymerizing monomers mainly containing an alkyl acrylate or a conjugated diene compound. If necessary, in addition to the above monomers, other monofunctional polymerizable monomers can be added when the polymerization is carried out. Examples of other monofunctional polymerizable monomers include methacrylates such as methyl methacrylate, ethyl methacrylate, propyl methacrylate, butyl methacrylate, amyl methacrylate, hexyl methacrylate, 2-ethylhexyl methacrylate, cyclohexyl methacrylate, octyl methacrylate, decyl methacrylate, dodecyl methacrylate, octadecyl methacrylate, phenyl methacrylate, benzyl methacrylate, naphthyl methacrylate, and isobornyl methacrylate; aromatic vinyl compounds such as styrene and α-methyl styrene; and acrylonitrile. It is preferable that the other monofunctional polymerizable monomers are contained in an amount of 20% by weight or less of the total of the polymerizable monomers that are to be a polymer forming the rubber layer.

The polymer contained in the rubber layer forming a part of the multilayered polymer particles (B) used in the present invention preferably has a crosslinked molecular structure in a polymer chain in order to express rubber elasticity. Furthermore, it is preferable that the polymer chains in the rubber layer are grafted to polymer chains in a layer adjacent to the rubber layer by chemical bonds. To achieve this, it may be preferable that a small amount of polyfunctional polymerizable monomers is contained as a crosslinking agent or a grafting agent in polymerization of monomers to form the polymers for the rubber layer.

The polyfunctional polymerizable monomer is a monomer having at least two carbon-carbon double bonds in its molecule. Examples of the polyfunctional polymerizable monomer include esters of unsaturated carboxylic acids (e.g., acrylic acid, methacrylic acid, and cinnamic acid) and unsaturated alcohols (e.g., allyl alcohol and methallyl alcohol) or glycols (e.g., ethylene glycol and butanediol); and esters of dicarboxylic acids (e.g., phthalic acid, terephthalic acid, isophthalic acid, and maleic acid) and the aforementioned unsaturated alcohols. Specific examples of the polyfunctional polymerizable monomers include allyl acrylate, methallyl acrylate, allyl methacrylate, methallyl methacrylate, allyl cinnamate, methallyl cinnamate, diallyl, maleate, diallyl phthalate, diallyl terephthalate, diallyl isophthalate, divinyl benzene, ethylene glycol di(meth) acrylate, butanediol di(meth)acrylate, and hexanediol di(meth)acrylate. The term "di(meth)acrylate" means a generic category of "diacrylate" and "dimethacrylate". The polyfunctional polymerizable monomers can be used alone or in combination. In particular, allyl methacrylate can be used preferably.

The amount of the polyfunctional polymerizable monomer used is preferably not more than 10% by weight of the total of the polymerizable monomers forming a polymer constituting the rubber layer. This is because when the amount of the polyfunctional polymerizable monomer is too large, the performance of the rubber would be degraded, and then the flexibility of the thermoplastic resin composition would be degraded, In the case where a monomer containing a conjugated diene compound as a main component is used, it is not necessary to use the polyfunctional polymerizable monomer, because the monomer itself functions as a crosslinking or grafting point.

Examples of a radical polymerizable monomer that can be used to form a polymer constituting the hard layer in the present invention include alkyl methacrylate such as methyl methacrylate, ethyl methacrylate, propyl methacrylate, and butyl methacrylate; methacrylates having an alicylic moiety such as cyclohexyl methacrylate, isobornyl methacrylate, and adamantyl methacrylate; methacrylates having an aromatic ring such as phenyl methacrylate; aromatic vinyl compounds such as styrene, and α-methyl styrene; and acrylonitrile. These radical polymerizable monomers can be used alone or in combination. Preferable radical polymerizable monomers are methyl methacrylate or styrene alone, or a combination of two or more of radical polymerizable monomers containing methyl methacrylate or styrene as a main component.

When the polymer constituting the multilayered polymer particles (B) contains at least one functional group having a reactivity with or an affinity for a hydroxyl group, the dispersibility of the multilayered polymer particles (B) in the EVOH (A) is improved. Thus, the gas barrier properties and/or the anti-crack properties of the obtained thermoplastic resin composition (C) layer become better, so that the anti-crack properties of the pipe for hot water circulation obtained by the use of this composition are improved. Therefore, in a polymerization reaction for producing the multilayered polymer particles (B), it is preferable to use, as a part of the monomers, a radical polymerizable compound that contains a functional. group having a reactivity with or an affinity for a hydroxyl group or such a functional group in protected form.

As a copolymerizable compound that can be preferably used to form the functional group of a polymer in the multilayered polymer particles (B) and that has a reactivity with or an affinity for a hydroxyl group, unsaturated compounds can be used. The unsaturated compounds have a group that can react with the hydroxyl group in the EVOH (A) under the mixing conditions described below to form a chemical bond or a group that can form an intermolecular linkage such as a hydrogen bond together with the hydroxyl group under the mixing conditions described below. Examples of functional groups having a reactivity with or an affinity for a hydroxyl group include hydroxyl group, epoxy group, isocyanate group (—NCO), and acid groups such as carboxylic group, acid anhydride groups such as groups derived from maleic anhydride, and groups from which a protecting group can be removed under the mixing conditions described below to convert into either one of the aforementioned groups.

Specific examples of the copolymerizable compound having a reactivity with or an affinity for a hydroxyl group include polymerizable compounds having a hydroxyl group such as 2-hydroxyethyl (meth)acrylate, 3-hydroxypropyl (meth)acrylate, 2-hydroxyethyl crotonate, 3-hydroxy-1-propene, 4-hydroxy-1-butene, cis-4-hydroxy-2-butene, and trans-4-hydroxy-2-butene; epoxy group containing polymerizable compounds such as glycidyl acrylate, glycidyl methacrylate, allyl glycidyl ether, 3,4-epoxy butene, 4,5-epoxy pentyl (meth)acrylate, 10,11-epoxy undecyl methacrylate, and p-glycidyl styrene; carboxylic acids such as acrylic acid, methacrylic acid, crotonic acid, cinnamic acid, itaconic acid, maleic acid, citraconic acid, aconitic acid, mesaconic acid, and methylenemalonic acid. The term "(meth)acrylate" means a generic category of "acrylate" and "methacrylate". The term "(meth)acrylic acid" means a generic category of "acrylic acid" and "methacrylic acid".

Among the aforementioned functional groups having a reactivity with or an affinity for a hydroxyl group, acid groups such as carboxyl group, acid anhydride groups derived from maleic anhydride, and epoxy group are preferable. Among these, acid groups such as carboxyl group or epoxy group are particularly preferable. Examples of the copolymerizable compound having acid groups such as carboxyl group include methacylic acid and acrylic acid, and examples of the copolymerizable compound having epoxy group include glycidyl methacrylate and glycidyl acrylate.

The amount of the copolymerizable compound that contains a functional group having a reactivity with or an affinity for a hydroxyl group or such a functional group in protected form is preferably 0.01 to 75% by weight with respect to the total of the monomers for producing the multilayered polymer particles (B), and more preferably 0.1 to 40% by weight. The above-described protected group can be any group that can be removed under the conditions when mixing with the EVOH (A) as described later and provides one of the above functional groups, as long as it does not interfere the purpose of the present invention. Examples of the copolymerizable compounds having a protected functional group include t-butyl methacryl carbamate.

When the multilayered polymer particles (B) has a polymer that contains a functional group having a reactivity with or an affinity for a hydroxyl group, it is preferable that this functional group is present on the molecular chains of the polymer that constitutes a hard layer, which is the outermost layer. However, in a resin composition containing the EVOH (A) and the multilayered polymer particles (B), this functional group may be present in any of the polymers constituting the layers (i.e., the outermost layer, the intermediate layer or the core layer) of the multilayered polymer particles (B), as long as it can react substantially with a hydroxyl group in the EVOH (A) or can form an intermolecular linkage with a hydroxyl group in the EVOH (A).

It is preferable that the content of the rubber layer in the multilayered polymer particles (B) is in the range from 50 to 90% by weight. When the content of the rubber layer is too small, the flexibility is insufficient. On the other hand, when the content is too large, the handling properties of the multilayered polymer particles (B) are degraded.

There is no limitation on the method of polymerization for producing the multilayered polymer particles (B) used in the present invention, and for example, using regular emulsion polymerization, spherical multilayered polymer particles (B) can be easily obtained. Emulsion polymerization can be performed by a process generally employed by those skilled in the art, and a chain transfer agent such as octyl mercaptan or lauryl mercaptan can be used, if necessary. After the emulsion polymerization, the multilayered polymer particles (B) are separated from the resultant polymer latex and collected by a process generally employed by those skilled in the art (e.g., a process such as coagulation followed by drying).

In this case, there is no limitation on the average particle size of each of the obtained multilayered polymer particles (B). However, when the average particle size is too small, the handling properties of the multilayered polymer particles (B) become poor. On the other hand, when it is too large, the effect of improving the anti-crack properties of the resin composition of the present invention becomes small. Therefore, it is preferable that the average particle size of each of the multilayered polymer particles (B) is in the range from 0.02 to 2 $\mu$m, and more preferably in the range from 0.05 to 1.0 $\mu$m. Furthermore, there is no limitation on the form of the produced multilayered polymer particles (B), and for example, the multilayered polymer particles (B) may be in the form of pellets, powder, or granules where the multilayered polymer particles (B) are fused or aggregated each other at the outermost layer portion (hereinafter, also referred to as aggregate particles). Either in totally independent form or aggregate particle form, the multilayered polymer particles (B) can be used to produce the thermoplastic resin composition (C).

The obtained multilayered polymer particles (B) are dispersed in the EVOH (A) to produce the thermoplastic resin composition (C) used in the present invention. The weight ratio (A/B) of the EVOH (A) to the multilayered polymer particles (B) is preferably in the range of 99/1 to 50/50% by weight in view of the balance between the flexibility and the gas barrier properties, and more preferably 97/3 to 60/40, and even more preferably 95/5 to 70/30, and most preferably 90/10 to 80/20.

The thermoplastic resin composition (C) used in the present invention can be produced by any suitable method used by those skilled in the art. For example, when using a melt-blending method, the EVOH (A), the multilayered polymer particles (B), and if necessary, a stabilizer, a dye, a pigment, a plasticizer, a lubricant, a filler, an antioxydant and other resins may be mixed as appropriate, and may be melt-kneaded at a temperature of, for example, 200 to 300° C. with a screw type extruder or the like.

In the thermoplastic resin composition (C), there is no limitation on the dispersion state of the multilayered polymer particles (B) in the EVOH (A). The multilayered polymer particles (B) can be dispersed in either one of the following states: a state where the multilayered polymer particles (B) are dispersed uniformly in the form of individual particles being totally independent; a state where the multilayered polymer particles (B) are dispersed uniformly in the form of aggregate particles where a plurality of the individual particles are fused or aggregated with each other; and a state where both forms of the totally independent particles and the aggregate particles are present and are dispersed uniformly. The average particle size of the dispersed multilayered polymer particles (B) including the totally independent form and the aggregate particle form is preferably 10 $\mu$m or less, more preferably 5 $\mu$m or less, and even more preferably 2 $\mu$m or less. It is particularly preferable that the multilayered polymer particles (B) are dispersed in the form of particles having an average particle size in the range of 0.03 to 1 $\mu$m uniformly in the EVOH (A). When the particle size of the dispersed particles exceeds 10 $\mu$m, it is difficult for the multilayered polymer particles (B) to be dispersed uniformly in a matrix of the EVOH (A), and thus the anti-crack properties become poor.

Examples of a stabilizer that can be blended with the thermoplastic resin composition (C) used in the present invention include oxidation stabilizers, heat stabilizers, UV stabilizers, and the like, and in general, stabilizers used for addition polymers are preferable. As the oxidation stabilizer and the heat stabilizer, at least one of phenols, hydroquinons and phosphates having a steric hindered structure can be used. Furthermore, examples of the UV stabilizer include various substituted resorcinols, salicylates, benzotriazole, benzophenone, and the like.

It is desired that an antioxidant is contained in the thermoplastic resin composition (C) used in the present invention in addition to the above resins. Examples of the antioxidant include 3,5-t-butyl-4-hydroxytoluene, Irganox 1010 (trade name, manufactured by Chiba-Geigy Corporation), and Irganox 1076 (trade name, manufactured by Chiba-Geigy Corporation). Furthermore, other suitable additives (e.g., heat stabilizers, plasticizers, UV absorbers, colorants, fillers, and other resins) can be contained, but these additives are used in ranges that do not interfere with the effect of the pipe for hot water circulation of the present invention.

The pipe for hot water circulation including the thermoplastic resin composition (C) layer comprising 50 to 99% by weight of the EVOH (A) and 1 to 50% by weight of the multilayered polymer particles (B) can be a molded product of a single layer structure of only this thermoplastic resin composition (C) layer, but preferably, a molded product of a multilayered structure including this thermoplastic resin composition (C) layer and another thermoplastic resin (E) layer. Preferable examples of a resin forming the thermoplastic resin (E) layer adjacent to the thermoplastic resin composition (C) layer include polyolefins, and thermoplastic resins obtained by an addition reaction or a grafting reaction of maleic anhydride with a polyolefin. Examples of the polyolefins include high density, medium density or low density polyethylene; polyethylene that contains vinyl acetate, an acrylate, or an α-olefin such as butene or hexene as a copolymer component; ionomer resins; polypropylene homopolymer; polypropylene copolymers containing an α-olefin such as ethylene, butene or hexene as a copolymer component; modified polypropylenes that are blends of polypropylene and rubber polymers. Examples of other resins constituting the thermoplastic resin (E) layer include polyamide resins, polyester resins, polystyrene resins, polyvinyl chloride resins, acrylic resins, polyurethane resins, polycarbonate resins, and polyvinyl acetate resins.

Furthermore, an adhesive resin (F) layer may be provided between the thermoplastic resin composition (C) layer and the adjacent thermoplastic resin (E) layer constituting the multiple layers of the pipe for hot water circulation of the present invention. There is no particular limitation on the adhesive resin (F). Typical examples thereof include those obtained by grafting an unsaturated carboxylic acid or its anhydride (maleic anhydride or the like) to an olefin polymer or copolymer (e.g., LLDPE, VLDPE or the like), ethylene-vinyl acetate copolymer, and an ethylene-(meth) acrylate copolymer.

There is no particular limitation on the methods for producing the pipe for hot water circulation. For example, an endless pipe can be obtained most efficiently by co-extrusion molding with two or three extruders and a circular die used for preparing multilayered structures.

There is no particular limitation on the layer structure of the multilayered structure (pipes). In view of molding and cost, typical examples of the structure are as follows: (outer) thermoplastic resin (E) layer/thermoplastic resin composition (C) layer/thermoplastic resin (E) layer (inner); (outer) thermoplastic resin composition (C) layer/adhesive resin (F) layer/thermoplastic resin (E) layer (inner); and (outer) thermoplastic resin (E) layer/adhesive resin (F) layer/ thermoplastic resin composition (C) layer/adhesive resin (F) layer/thermoplastic resin (E) layer (inner). When the thermoplastic resin (E) layers are provided as both outer layers, different resins or the same resin can be used.

Among these, the structure of (outer) thermoplastic resin composition (C) layer/adhesive resin (F) layer/thermoplastic resin (E) layer (inner) is particularly preferable. In view of the gas barrier properties, it is particularly advantageous to provide the thermoplastic resin composition (C) layer as the outermost layer of the pipe. However, conventional resins have poor anti-crack properties. Therefore, when the gas barrier resin is used for the outer layer of a pipe, once a crack occurs, the appearance and the barrier properties of the pipe are degraded. As a result, the commercial value as a pipe for hot water circulation is significantly damaged. Therefore, conventionally, a gas barrier resin composition cannot be used for the outermost layer. By contrast, the thermoplastic resin composition (C) used in the present invention has excellent gas barrier properties and anti-crack properties, so that the present invention can, for the first time, provide a pipe for hot water circulation in which no cracks occur even though a resin composition having gas barrier properties is used for the outermost layer.

The multilayered pipe for hot water circulation of the present invention produced by a method including the above-described method is useful as a pipe for hot water circulation having excellent gas barrier properties and anti-crack properties, in particular, anti-crack properties at low temperatures. The multilayered pipe for hot water circulation of the present invention can be used as a pipe for various types of liquid, or gas as well. In other words, the term "for hot water circulation" includes applications for circulation of various types of liquid or gas.

EXAMPLES

Hereinafter, the present invention will be described further in detail by way of examples, but the present invention is not limited by these examples.

Table 1 shows EVOH resins used in the examples and the comparative examples of the present invention.

TABLE 1

|  | Ethylene content (mol %) | Degree of saponification (mol %) | Melting point (° C.) | MFR *1) (g/10 min) |
| --- | --- | --- | --- | --- |
| A-1 | 32 | 99.5 | 183 | 1.6 |
| A-2 | 44 | 99.5 | 165 | 6 |

*1) measurement conditions:190° C.; 2160 g

First, multilayered polymer particles (B) were produced. Preparation Examples 1 to 4 of the multilayered polymer particles (B) are shown below.

Preparation Example 1
Production of Multilayered Polymer Particles

First, 600 parts by weight of distilled water, 0.136 parts by weight of sodium salt of lauryl sarcosine as an emulsifier and 1.7 parts by weight of sodium stearate were fed into a polymerization vessel provided with a stirrer, a condenser and a dropping funnel under a nitrogen atmosphere, and were heated to 70° C. and dissolved uniformly. Then, at the same temperature, 100 parts by weight of butyl acrylate, 60 parts by weight of ethyl acrylate, and 2.0 parts by weight of allyl methacrylate as a polyfunctional polymerizable monomer were added, and stirred for 30 minutes. Thereafter, 0.15 parts by weight of potassium peroxodisulfate were added thereto to initiate polymerization. Four hours later, it was confirmed by gas chromatography that all the monomers were consumed.

Then, 0.3 parts by weight of potassium peroxodisulfate were added to the obtained copolymer latex, and then a mixture of 60 parts by weight of methyl methacrylate, 20 parts by weight of methacrylic acid and 0.1 parts by weight of n-octyl mercaptan as a chain transfer agent was added dropwise with a dropping funnel over 2 hours. After the addition was completed, the reaction was continued for a further 30 minutes at 70° C., and the polymerization reaction was completed with the confirmation that all the monomers were consumed. The average size of the particles contained in the obtained latex was 0.20 μm. The latex was cooled at −20° C. for 24 hours to aggregate, and then the aggregate was taken out and washed three times with hot water at 80° C. The aggregate was dried under reduced pressure at 50° C. for 2 days, and thus polymer particles (B-1) of two-layer structure having a core layer of acrylic rubber (Tg=−44° C.) containing butyl acrylate and ethyl acrylate as copolymer components and a hard outermost layer made of a polymer (Tg=128° C.) containing methyl methacrylate and methacrylic acid as copolymer components were obtained. The particle size of the multilayered polymer particles (B-1) in the thus obtained latex was measured by dynamic light scattering using a laser particle size analysis system PAR-III (manufactured by Otsuka Electronic Co., Ltd.). The results were that the average particle size of the multilayered polymer particles (B-1) was 0.20 μm.

Preparation Example 2
Production of Multilayered Polymer Particles

First, 600 parts by weight of distilled water, 0.15 parts by weight of sodium salt of lauryl sarcosine as an emulsifier and 1.3 parts by weight of sodium stearate were fed into a polymerization vessel provided with a stirrer, a condenser and a dropping funnel under a nitrogen atmosphere, and were heated to 70° C. to be dissolved uniformly. Then, at the same temperature, 150 parts by weight of butyl acrylate and 0.8 parts by weight of allyl methacrylate as a polyfunctional polymerizable monomer were added thereto and stirred for 30 minutes. Thereafter, 0.15 parts by weight of potassium peroxodisulfate were added thereto to initiate polymerization. Four hours later, it was confirmed by gas chromatography that all the monomers were consumed.

Then, 0.3 parts by weight of potassium peroxodisulfate were added to the obtained copolymer latex, and then a mixture of 45 parts by weight of methyl methacrylate and 5 parts by weight of maleic acid was added dropwise with a dropping funnel over 2 hours. After the addition was completed, the reaction was continued for a further 30 minutes at 70° C., and the polymerization reaction was completed with the confirmation that all the monomers were consumed. The average size of the particles contained in the obtained latex was 0.32 μm. The latex was cooled at −20° C. for 24 hours to aggregate, and then the aggregate was taken out and washed three times with hot water at 80° C. The aggregate was dried under reduced pressure at 50° C. for 2 days, and thus polymer particles (B-2) of two-layer structure having a core layer of acrylic rubber (Tg=−54° C.) containing butyl acrylate as a main component and a hard outermost layer made of a polymer (Tg=105° C.) containing methyl methacrylate and maleic acid as copolymer components were obtained. The particle size of the multilayered polymer particles (B-2) in the thus obtained latex was measured by dynamic light scattering using a laser particle size analysis system PAR-III (manufactured by Otsuka Electronic Co., Ltd.). The results were that the average particle size of the multilayered polymer particles (B-2) was 0.32 μm.

Preparation Example 3
Production of Multilayered Polymer Particles

First, 600 parts by weight of distilled water, 0.136 parts by weight of sodium salt of lauryl sarcosine as an emulsifier and 1.7 parts by weight of sodium stearate were fed into a polymerization vessel provided with a stirrer, a condenser and a dropping funnel under a nitrogen atmosphere, and were heated to 70° C. to be dissolved uniformly. Then, at the same temperature, 100 parts by weight of butyl acrylate, 60 parts by weight of ethyl acrylate, and 2.0 parts by weight of allyl methacrylate as a polyfunctional polymerizable monomer were added, and stirred for 30 minutes. Thereafter, 0.15 parts by weight of potassium peroxodisulfate were added thereto to initiate polymerization. Four hours later, it was confirmed by gas chromatography that all the monomers were consumed.

Then, 0.3 parts by weight of potassium peroxodisulfate were added to the obtained copolymer latex, and then a mixture of 70 parts by weight of styrene, 10 parts by weight of glycidyl methacrylate and 0.1 parts by weight of n-octyl mercaptan as a chain transfer agent was added dropwise with a dropping funnel over 2 hours. After the addition was completed, the reaction was continued for further 30 minutes at 70° C., and the polymerization reaction was completed with the confirmation that all the monomers were consumed. The average size of the particles contained in the obtained latex was 0.20 μm. The latex was cooled at −20° C. for 24 hours to aggregate, and then the aggregate was taken out and washed three times with hot water at 80° C. The aggregate was dried under reduced pressure at 50° C. for 2 days, and thus polymer particles (B-3) of two-layer structure having a core layer of acrylic rubber (Tg=−49° C.) containing butyl acrylate and ethyl acrylate as copolymer components and a hard outermost layer made of a polymer (Tg=93° C.) containing styrene and glycidyl methacrylate as copolymer components were obtained. The particle size of the multilayered polymer particles (B-3) in the thus obtained latex was measured by dynamic light scattering using a laser particle size analysis system PAR-III (manufactured by Otsuka Electronic Co., Ltd.). The results were that the average particle size of the multilayered polymer particles (B-3) was 0.20 μm.

Preparation Example 4
Production of Multilayered Polymer Particles

First, 600 parts by weight of distilled water, 0.15 parts by weight of sodium salt of lauryl sarcosine as an emulsifier and 1.3 parts by weight of sodium stearate were fed into a polymerization vessel provided with a stirrer, a condenser and a dropping funnel under a nitrogen atmosphere, and were heated to 70° C. to be dissolved uniformly. Then, at the same temperature, 170 parts by weight of butyl acrylate and 0.8 parts by weight of allyl methacrylate as a polyfunctional polymerizable monomer were added, and stirred for 30 minutes. Thereafter, 0.15 parts by weight of potassium peroxodisulfate were added thereto to initiate polymerization. Four hours later, it was confirmed by gas chromatography that all the monomers were consumed.

Then, 0.3 parts by weight of potassium peroxodisulfate were added to the obtained copolymer latex, and then a mixture of 20 parts by weight of methyl methacrylate, 8 parts by weight of ethyl acrylate, and 2 parts by weight of methacrylic acid was added dropwise with a dropping funnel over 2 hours. After the addition was completed, the reaction was continued for further 30 minutes at 70° C., and the polymerization reaction was completed with the confirmation that all the monomers were consumed. The average size of the particles contained in the obtained latex was 0.30 μm. The latex was cooled at −20° C. for 24 hours to aggregate, and then the aggregate was taken out and washed three times with hot water at 80° C. The aggregate was dried under reduced pressure at 50° C. for 2 days, and thus polymer particles (B-4) of two-layer structure having a core layer of acrylic rubber (Tg=−54° C.) containing butyl acrylate as a main component and a hard outermost layer made of a polymer (Tg=145° C.) containing methyl methacrylate, ethyl acrylate, and methacrylic acid as copolymer components were obtained. The particle size of the multilayered polymer particles (B-4) in the thus obtained latex was measured by dynamic light scattering using a laser particle size analysis system PAR-III (manufactured by Otsuka Electronic Co., Ltd.). The results were that the average particle size of the multilayered polymer particles (B-4) was 0.30 μm.

Example 1

A dry blend comprising 90 parts by weight of an EVOH (A-1) having an ethylene content of 32 mol %, a saponification degree of 99.5 mol %, a MFR (190° C., under a load of 2160 g) of 1.6 g/10 min, and a melting point of 183° C. and 10 parts by weight of the multilayered polymer particles (B-1) obtained in Preparation Example 1 were fed into a twin screw vent type extruder and pelletized with extrusion at 220° C. under a nitrogen atmosphere. Thus, pellets of an EVOH polymer composition (C-1) were obtained.

Separately, 100 parts by weight of high density polyethylene (HDPE: Yukaron Hard BX-50 manufactured by Mitsubishi Petrochemical Co., Ltd) having a density of 0.952 g/cc and a MFR of 0.5 g/10 min, 2 parts by weight of vinyl trimethoxy silane dissolved in acetone, and 0.2 parts by weight of dicumyl peroxide were mixed. This mixture was extruded in the form of a strand with a single screw extruder at 230° C., and pellets of modified polyethylene (HDPE; thermoplastic resin (E-1)) containing 1.5% by weight of vinyl silane as an addition polymerized component were obtained.

Then, a blend of 100 parts by weight of these pellets (E-1) and 5 parts by weight of BX-50 containing 2 parts by weight of dibutyltin dilaurate were fed into an extruder, and the pellets of EVOH resin composition (C-1) obtained above were fed into another extruder, and an adhesive resin (maleic anhydride modified LDPE) (F-1) was fed into another extruder. Then, a multilayered pipe having an outer diameter of 20mm including the EVOH resin composition (C)/the adhesive resin (F)/HDPE (E) (100/100/2000 μm) was produced with a circular die for producing a three resin-, three layered-structure.

Oxygen barrier properties and anti-crack properties of the obtained multilayered pipe were evaluated by the following method.
(1) Oxygen Barrier Properties The oxygen barrier properties were evaluated by the dissolution rate of oxygen. The smaller the increasing rate is, the better the oxygen barrier properties are.

Water from which dissolved oxygen had been removed by the use of a packed tower packed with metal tin was obtained. This water was circulated in the obtained pipe at 70° C. The dissolution rate of oxygen in the circulating water was measured under conditions of 20° C. and 65%RH. As a result, the dissolution rate of oxygen was 25 μg/liter·hr. Herein, the dissolution rate (μg/liter·hr) means the rate of increase (μg/hr) of dissolved oxygen per liter of water circulating in the pipe. In other words, when the entire volume of water in the equipment system including the pipe is V1cc, the volume of water in the pipe is V2cc, and the increased amount of the dissolved oxygen concentration in the water circulating in the system per unit time is B μg/liter·hr, then the dissolution rate of oxygen (A μg/liter·hr) is A=B (V1/V2).

(2) Anti-crack Properties

The obtained pipe was cut into a piece having a length of 20 cm, and was allowed to stand in a thermostatic container at −15° C. for 10 minutes. Then, the pipe was enlarged from the pipe end on one side slowly by four discrete operations using a metal enlargement tool with four hooks until an inner diameter of the pipe reached 30 mm. Thereafter, it was visually observed whether or not there is any crack on the EVOH layer. A hundred pipe samples were used for this test, and evaluated with the following four criteria A to D which express frequency (incidence percentage) of crack generations.

A: No cracks occurred.
B: Small cracks occurred.
C: Small cracks and large cracks occurred.
D: Only large cracks occurred.

(3) Attachment onto Extrusion Die

The production of the pipe having the above-described structure was performed continuously for 10 hours, and the amount of resin attached onto the extrusion die was visually observed.

The results of the evaluation are shown in Table 2 below together with the results of Examples 2 to 6 and Comparative Examples 1 to 4.

Examples 2 to 4

Multilayered pipes were produced in the same manner as in Example 1 except that B-2 (Example 2), B-3 (Example 3), and B-4 (Example 4) were respectively used instead of B-1 as the multilayered polymer particles, and were evaluated. Table 2 shows the results.

Example 5

Multilayered pipe was produced in the same manner as in Example 1 except that a blend of 80 parts by weight of the EVOH (A-1) and 20 parts by weight of the multilayered polymer particles (B-1) was used as the dry blend, and was evaluated. Table 2 shows the results.

Example 6

Multilayered pipe was produced in the same manner as in Example 1 except that EVOH (A-2) was used instead of EVOH (A-1), and was evaluated. Table 2 shows the results.

Comparative Example 1

Multilayered pipe was produced in the same manner as in Example 1 except that only EVOH (A-1) resin was used instead of the EVOH resin composition (C-1), and was evaluated. Table 2 shows the results.

Comparative Example 2

Multilayered pipe was produced in the same manner as in Example 1 except that a blend of 40 parts by weight of the EVOH (A-1) and 60 parts by weight of the multilayered polymer particles (B-1) was used as the dry blend, and was evaluated. Table 2 shows the results.

Comparative Examples 3 and 4

Multilayered pipes were produced in the same manner as in Example 1 except that ethylene-methacrylic acid copolymer (Nucrel 0309HC manufactured by Mitsui Du Pont; the content of methacrylic acid as copolymer component: 9% by weight; Comparative Ex. 3) and linear low density polyethylene modified with maleic anhydride (Admer NF468A manufactured by Mitsui Chemicals, Inc.; Comparative Ex. 4) were used instead of the multilayered polymer particles, and were evaluated. Table 2 shows the results.

TABLE 2

| | Resin composition | | Performance evaluation | | | | | |
|---|---|---|---|---|---|---|---|---|
| | A (parts by weight) | B (parts by weight) | Anti-crack properties | | | | Attachment onto extrusion die | Oxygen barrier properties*1) |
| | | | A | B | C | D | | |
| Ex. 1 | A-1 90 | B-1 10 | 96 | 4 | 0 | 0 | Absent | 25 |
| Ex. 2 | A-1 90 | B-2 10 | 93 | 7 | 0 | 0 | Absent | 25 |
| Ex. 3 | A-1 90 | B-3 10 | 93 | 7 | 0 | 0 | Absent | 25 |
| Ex. 4 | A-1 90 | B-4 10 | 85 | 15 | 0 | 0 | Absent | 27 |
| Ex. 5 | A-1 80 | B-1 20 | 100 | 0 | 0 | 0 | Absent | 32 |
| Ex. 6 | A-2 90 | B-1 10 | 98 | 2 | 0 | 0 | Absent | 44 |
| Com. Ex. 1 | A-1 100 | — | 0 | 0 | 18 | 82 | Absent | 22 |
| Com. Ex. 2 | A-1 40 | B-1 60 | 100 | 0 | 0 | 0 | Absent | 270 |
| Com. Ex. 3 | A-1 90 | *2)EMAA 10 | 11 | 24 | 35 | 30 | Small amount | 29 |
| Com. Ex. 4 | A-1 90 | *3)mLLDPE 10 | 95 | 5 | 0 | 0 | Large amount | 26 |

*1)unit: μg/liter · hr
*2)EMAA: ethylene - methacrylic acid copolymer (Nucrel 0309HC from Mitsui Du Pont)
*3)mLLDPE: linear low density polyethylene modified with maleic anhydride (Admer NF468A from Mitsui Chemicals, Inc.)

Large cracks occurred in 80 to 90% of the multilayered pipes of Comparative Example 1 having an EVOH layer free from the multilayered polymer particles (B). The multilayered pipes of Comparative Example 2, which have an EVOH layer containing more than 50% by weight of the multilayered polymer particles (B), exhibited good results with respect to the anti-crack properties, but exhibited poor oxygen barrier properties. The multilayered pipes of Comparative Example 3, which have an EVOH layer containing ethylene-methacrylic acid copolymer instead of the multilayered polymer particles (B), exhibited good results with respect to the oxygen barrier properties, but exhibited poor results with respect to anti-crack properties and attachment onto extrusion die, especially, exhibited poor results of anti-crack properties. The multilayered pipes of Comparative Example 4, which have an EVOH layer using linear low density polyethylene modified with maleic anhydride instead of the multilayered polymer particles (B) exhibited good results with respect to the oxygen barrier properties and the anti-crack properties, but exhibited poor results with respect to attachment onto extrusion die.

On the other hand, the results show that the multilayered pipes of the present invention, which have the EVOH composition (C) layer containing 10 to 20% by weight of the multilayered polymer particles (B), have substantially no cracks and have excellent gas barrier properties and anti-crack properties, and are suitable for pipes for hot water circulation.

INDUSTRIAL APPLICABILITY

The present invention provides pipes for hot water circulation that contain a resin composition having excellent performance in gas barrier properties and anti-crack properties, in particular, anti-crack properties at low temperatures.

What is claimed is:

1. A multilayered pipe comprising a thermoplastic resin composition (C) layer containing 50 to 99% by weight of an ethylene-vinyl alcohol copolymer (A) and 1 to 50% by weight of multilayered polymer particles (B), wherein the multilayered polymer particles (B) have an outermost layer which contains a polymer having at least one functional group selected from the group consisting of a hydroxyl group, an epoxy group, an isocyanate group (—NCO), an acid anhydride group, and a carboxyl group derived from (meth)acrylic acid.

2. The multilayered pipe of claim 1, wherein the multilayered polymer particles (B) have a hard layer as an outermost layer and a rubber layer which is located inside of the hard layer.

3. The multilayered pipe of claim 1, wherein the outermost layer of the multilayered polymer particles (B) contains a polymer that has a carboxyl group derived from (meth)acrylic acid.

4. The multilayered pipe of claim 1, wherein the outermost layer of the multilayered polymer particles (B) contains a polymer that has an epoxy group.

5. A multilayered pipe comprising a thermoplastic resin composition (C) layer containing 50 to 99% by weight of an ethylene-vinyl alcohol copolymer (A) and 1 to 50% by weight of multilayered polymer particles (B), wherein the thermoplastic resin composition (C) layer is an outermost layer of the multilayered pipe.

* * * * *

UNITED STATES PATENT AND TRADEMARK OFFICE
CERTIFICATE OF CORRECTION

PATENT NO. : 6,447,858 B1
DATED : September 10, 2002
INVENTOR(S) : Shimo et al.

It is certified that error appears in the above-identified patent and that said Letters Patent is hereby corrected as shown below:

<u>Title page,</u>
Item [30], Foreign Application Priority Data should read:

-- [30]  Foreign Application Priority Data

Oct. 8, 1999    (JP) ..................... 11-288782 --

Signed and Sealed this

Fourteenth Day of January, 2003

JAMES E. ROGAN
*Director of the United States Patent and Trademark Office*